United States Patent [19]

Canevari

[11] 4,326,986
[45] Apr. 27, 1982

[54] COMPOSITION AND METHOD FOR SUPPRESSING VAPOR LOSS OF VOLATILE HYDROCARBONS

[75] Inventor: Gerard P. Canevari, Cranford, N.J.

[73] Assignee: Exxon Research & Engineering Co., Florham Park, N.J.

[21] Appl. No.: 702,692

[22] Filed: Jul. 6, 1976

[51] Int. Cl.³ ................................................ C09K 3/00
[52] U.S. Cl. .................................... 252/384; 422/42; 252/382; 252/351; 252/354
[58] Field of Search ............... 252/382, 384, 351, 354, 252/559, 557, 174.21, 174.22, DIG. 13; 21/60.5 R

[56] References Cited

U.S. PATENT DOCUMENTS 2,797,139  6/1957  Veatch ........................... 21/60.5 R
2,969,332  1/1961  Lawler et al. ...................... 252/354
3,903,008  9/1975  Deweever et al. ............ 252/DIG. 13

*Primary Examiner*—Benjamin R. Padgett
*Assistant Examiner*—J. L. Barr
*Attorney, Agent, or Firm*—Joseph J. Dvorak

[[57]  ABSTRACT

A very effective composition for inhibiting vapor losses of stored hydrocarbons comprises a mixture of a surfactant, such as a foaming agent, and a polyglycol. Indeed a method for retarding evaporation of volatile hydrocarbons from a body of liquid hydrocarbon material is provided by forming a thin film of these compositions on the surface of the body of liquid hydrocarbons.

11 Claims, 4 Drawing Figures

COMPOSITION AND METHOD FOR SUPPRESSING VAPOR LOSS OF VOLATILE HYDROCARBONS

BACKGROUND OF THE INVENTION

1. Field of the Invention

This invention relates to techniques for minimizing the evaporative losses of stored hydrocarbons. In particular, the present invention is concerned with suppressing the volatilization of hydrocarbons contained in petroleum products such as crude oil.

2. Background of the Invention

In the past, petroleum products, particularly crude oil, have been relatively inexpensive commodities with the result that conservation of these commodities was never of great consequence. In very recent years, however, increased world demand for all natural resources has subsignificantly altered the prior supply demand relationships so that losses of hydrocarbons from evaporation is deemed quite serious, not only from an environmental point of view but also from a conservation point of view. Indeed, this concern for preserving our natural resources applies not only to petroleum hydrocarbons but to all volatile liquids.

In the description to follow, reference will be made primarily to suppressing the loss of hydrocarbons by vaporization from crude oils; however, it is to be understood that crude oil is merely one example of a hydrocarbon which contains sufficient amounts of volatile components which will undergo vaporization in substantial amounts during storage.

As will be appreciated, crude oil contains a very wide spectrum of hydrocarbons ranging from those which have very high boiling points to those which would exist in the vapor state if they were isolated. Indeed, it is the presence of these latter materials that contributes to the significant vapor pressure of crude oil.

There have been a number of techniques suggested in the past for inhibiting the vaporization of hydrocarbons. For example, in U.S. Pat. No. 1,985,491, it is suggested that a fatty acid soap be mixed with water and then beat into a froth with a vigorous air blast. The froth, thereafter, is spread on the surface of oil, so as to minimize evaporation and oxidation of the oil.

In U.S. Pat. No. 2,822,238 evaporation of volatile nonaqueous liquid products is retarded by floating small hollow particles, wet by water, on the surface of the volatile liquid.

In U.S. Pat. No. 2,907,627, a technique is disclosed for inhibiting vapor loss by spreading a synthetic resin plastic such as a polyurethane on the surface of the crude petroleum. In contrast, thereto, U.S. Pat. No. 3,421,838 discloses the use of rubber cement as a vapor barrier for volatile petroleum products.

Other techniques suggested, inhibiting vaporization of hydrocarbon materials include the use of a gelling material to create an integral roof on an oil tank. In this regard see U.S. Pat. No. 3,639,258. Mention should be made also of the technique of preventing hydrocarbon losses during the loading of vessels by use of an aqueous foam which is stable during the period corresponding to that required for loading. For this technique, see U.S. Pat. No. 3,850,206. These last two techniques for inhibiting vaporization of hydrocarbons have more limited applicability than the above-mentioned techniques. Moreover, there still remains a need for simple, inexpensive and widely applicable techniques for inhibiting the loss of vapor from petroleum hydrocarbons.

SUMMARY OF THE INVENTION

This invention contemplates vaporization retarding compositions which when applied to the surface of a body of hydrocarbon liquid, forms an effective film type barrier inhibiting evaporation. Thus, in one aspect of the present inventions, there is provided an evaporation retarding mixture capable of forming a continuous stable film over the surface of a body of liquid hydrocarbon material comprising a surfactant and a polyglycol. The surfactant employed in the composition of the present invention is a surfactant which is substantially hydrocarbon insoluble. It must be a material which has the ability to pack tightly and to orient itself perpendicularly to the surface of the liquid hydrocarbon material being treated. Finally, the surfactant is one having a hydrocarbon moiety containing about 16 carbon atoms in a linear aliphatic group. The polyglycol is selected from a wide range of liquid polyhydroxy alkanes, including polyethylene glycols, polypropylene glycols, and the like. The preferred polyglycol of the present invention has a molecular weight generally in the range of about 100 to about 1200. Preferably, polyethylene glycol having a molecular weight of about 400 is the preferred polyglycol. The evaporation retardant compositions of the present invention will contain about 5 wt. % to about 50 wt. % of polyglycol based on the total weight of the mixture of polyglycol and surfactant. Preferably, however, about 9 wt. % to about 11 wt. % of the polyglycol will be employed.

In another embodiment of the present invention, there is provided a method for retarding evaporation of volatile hydrocarbons from a body of liquid hydrocarbon material by forming a thin film in the surface of the hydrocarbon of a vapor barrier material comprising a surfactant and a polyglycol.

These and other features in the present invention will be readily appreciated upon a reading of the detailed description which follows.

DETAILED DESCRIPTION OF INVENTION

Figure 1:
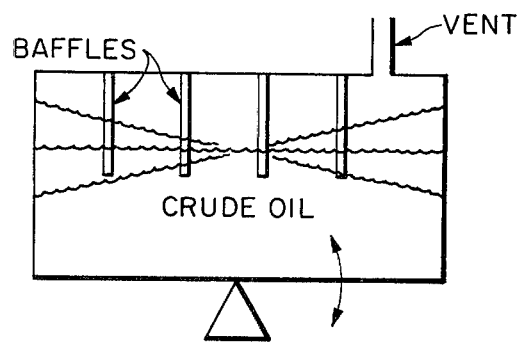
FIG. 1 is a diagrammatic illustration of a test tank used in demonstrating the effectiveness of the compositions of the present invention.

As indicated hereinabove, the present invention is concerned generally with suppressing hydrocarbon vapor loss from body of the hydrocarbon liquid by forming a continuous stable film of a barrier layer over to the surface of the body of liquid hydrocarbon. In the detailed description which follows, however, specific reference will be made to preventing loss of volatile hydrocarbon compounds from crude oil although the present invention is applicable to a wide range of volatile organic materials in addition to crude oils. Indeed, among the numerous hydrocarbon materials, the vaporization of which can be suppressed in accordance with the present invention are liquid aliphatic hydrocarbons, liquid alicyclic hydrocarbons, liquid aromatic hydrocarbons and mixtures of these. Specific examples of volatile hydrocarbons, the vaporization which can be substantially suppressed in accordance with the present invention include gasolines, heptanes, cyclohexanes, benzene, pyridene and the like. The foregoing recitation of these hydrocarbon materials that can be effectively treated in accordance with the present invention is not intended to be limiting, but merely exemplary of the wide applicability of the present invention.

Generally speaking, hydrocarbon losses by vaporization are substantially reduced in accordance with the practice of the present invention by forming a continuous stable film over the surface of a body of liquid hydrocarbon which operates as a barrier to vapor loss. It has now been found that excellent evaporization retarding compositions for such purposes comprise a surfactant and a polyglycol.

The surfactant of the retarding mixtures according to the present invention are characterized by the following criteria. First, the surfactant must be insoluble in the particular liquid hydrocarbon body being treated. Second, the surfactant must have the ability to pack tightly and to orient itself perpendicularly to the surface of the liquid hydrocarbon body. Third, the surfactant, to have sufficient resistance to hydrocarbon transfer from the surface of the liquid hydrocarbon body, must have hydrocarbon chain or moiety greater than about 8 carbon atoms, and more typically will have hydrocarbon moieties containing about 16 carbon atoms and greater.

It will be appreciated by those skilled in the art, the surfactants are generally classed as organic molecules containing both hydrophobic and hydrophilic groups in an organic molecule. Surfactants are further classified as being strong wetting agents or as strong detergents. In the case of strong wetting agents the hydrophobic group tends to be in the middle of the molecule. In contrast thereto, in strong detergents, the hydrophobic group is at the end of a hydrophilic group. Indeed, the hydrophilic group tends to be a linear hydrocarbon. In accordance with the practice of the present invention, the surfactants that are satisfactory are all strong detergents. More particularly, the most preferred surfactants are classified as foaming agents, i.e., they will form a foam if mixed with air or a suitable blowing agent.

Specific examples of eminently suitable strong detergents for the practice of the present invention are: the sulfosuccinates such as dioctylsulfosuccinate, dihexylsulfosuccinate, ditridecylsulfosuccinate, diethylhexylsulfosuccinate; soaps such as sodium laurate, sodium myristate, sodium palmitate, sodium stearate, and sodium oleate; non-ionic detergents such as the alkylaryl poly (oxyethylene) ethanols; cationic surfactants, such as amine salts such as cetyl trimethyl ammonium bromide, and quaternary ammonium compounds.

Many of the foregoing surfactants are available commercially as foaming agents. Consequently, it is one of the advantages of the present invention that commercially available foaming agents can be used as the surfactant. Such foaming agents include Foaming Agent 8578, 8581, 8549 and Foaming Agent ID20339 sold by Exxon Chemical Company U.S.A., New York City, N.Y.; Aer-O-Water sold by National Foam Systems, Inc. West Chester, Pa.; Light Water FC-200 Foam Concentrates sold by Minnesota Mining and Manufacturing Company, St. Paul, Minn.; and Igepal C0880 sold by Antara Chemicals, New York, N.Y.

The polyols suitable in the practice of the present invention include liquid ethylene glycols such as triethylene glycol, polypropylene glycol and polyethylene glycol. Generally, the glycol is one which has a molecular weight in the range of about 100 to 1200 and preferably about 400. The preferred polyglycol is polyethylene glycol.

In order to effectively inhibit the vaporization of hydrocarbons from a body of liquid hydrocarbon materials, it is necessary that the evaporation retarding mixture form a continuous stable film over the surface of the body of liquid hydrocarbon material. While not wishing to be bound by any theory, the polyethylene glycol components of the evaporative retarding mixtures of the present invention apparently associate with the hydrophilic portion of the surfactant through weak van der Waal forces thereby improving the impermeability of the film. A limited lamella of the glycol is supported by surface forces. By association with the hydrophilic moiety of the surfactant package, a sandwich-like molecular configuration results. In any event, it has been discovered that the addition of polyethylene glycol to the foregoing above-mentioned surfactant provides an effective evaporation retarding mixture which is capable of forming a continuous stable film over the surface of a body of liquid hydrocarbon material.

In the practice of the present invention, generally from about 5 to 50 wt. % of polyglycol based on the total weight of the evaporative retarding mixture is employed. It is preferred, however, that from 9 to 11 wt. % of polyethylene glycol as the glycol be used.

In applying the evaporation retarding mixture to the surface of a liquid hydrocarbon body, the mixture may be spread over the surface of the liquid hydrocarbon body by a convenient means. In the practice of the present invention, it is particularly preferred, however, that the evaporation retarding mixture be applied to the hydrocarbon body as a fine aerosol spray. Application in the form of a fine aerosol spray tends to more effectively utilize the material in film forming and minimizes the amount which may sink through the liquid hydrocarbon.

The amount of evaporation retarding material applied to the surface of the liquid hydrocarbon bodies is not critical. It can be applied in almost any amount sufficient to form a continuous thin film of the evaporation retarding mixture on the surface of the liquid hydrocarbon body. For most effective retardation of evaporation, however, the mixture will be applied in amounts sufficient to provide a film thickness greater than 70 monolayers and preferably in an amount ranging from about 210 to 350 monolayers. Thus, it will be readily appreciated by persons skilled in the art that the amount of material needed to form an effective barrier is relatively very small. Indeed, to form a film thickness of approximately 350 monolayers on the cargo of a 90,000 ton tanker, only about 3½ gallons of the evaporative retarding mixture would be required.

The unique features of certain aspects of the present invention are brought out in the following examples which are strictly illustrative and not to be construed as limiting in scope.

EXAMPLE 1

A series of tests were conducted using an open beaker that had a diameter of 2 inches. Some beakers were charged solely with a hydrocarbon liquid. Other beakers were charged solely with a hydrocarbon liquid and a commercially available foaming agent. In yet other beakers, liquid hydrocarbon was charged along with the evaporation retardant compositions of the present invention. The amount of hydrocarbon loss, was determined over a period of time. Test data and the results from the test are set forth in Table 1. It should be noted that in these tests, one drop (0.05 ml) of the evaporation retardant mixture was applied to the surface of the hydrocarbon body. This 0.05 ml of retardant mixture represents a thickness of approximately 6000 monolayers of material. However, this does not represent the minimum effective thickness for the mixture since a portion of the droplet in these tests did not remain on the surface. In some instances, a portion of the droplet decended into the liquid being tested.

Indeed, the commercially available foaming agent, Light Water, was approximately only 50% effective in suppressing vapor loss from both South Louisiana and Kuwait Crude oil. In contrast, thereto, the Aero-O-Water foam formulation was only slightly effective for the South Louisiana crude oil but was highly effective for the Kuwait Crude oil. This latter result was possibly due to the indigenous surfactants such as porphyrins that are known to be present in Kuwait crude oil. These compounds theoretically can combine with the Aer-O-Water surfactant and result at a more effective barrier film. Nonetheless, as can be seen, the addition of polyethylene glycol is highly effective in enhancing the evaporative retardant capabilities of the surfactants.

TABLE II

| Test No. | Crude Oil | Film Forming Material | Weight Loss, grams |
| --- | --- | --- | --- |
| 1 | So. La. | Aer-O-Water[1] | 10.4 |
| 2 | So. La. | 0 | 12.2 |
| 3 | So. La. | Light Water[2] | 5.8 |
| 4 | So. La. | Aer-O-Water[1]/Light | 1.5 |

TABLE I

| Test No. | Hydrocarbon | Amount of Test Hydrocarbon | Retardant Mixture | Amount of Retard Mixture | % Loss/Time elapsed, hrs. | |
| --- | --- | --- | --- | --- | --- | --- |
| 1 | Varsol[1] #1 | 25 ml | 0 | 0 | 50%/24 hrs. | 100%/72 hrs. |
| 2 | Varsol[1] #1 | 25 ml | Aer-O-Water/water 1:1 | .05 ml | 0%/24 hrs. | 0%/36 hrs. |
| 3 | Cyclohexane | 120 ml | 0 | 0 | 100%/6 hrs. | |
| 4 | Cyclohexane | 120 ml | Aer-O-Water/Water 1:1 | .05 ml | 0%/24 hrs. | 0%/48 hrs. |
| 5 | n-hexane | 100 ml | 0 | 0 | 20%/2 hrs. | 70%/7 hrs. |
| 6 | n-hexane | 100 ml | Aer-O-Water[2] & Triethyleneglycol 1:1 | .05 ml | 12%/2 hrs. | 40%/7 hrs. |
| 7 | n-hexane | 100 ml | Aer-O-Water[2] & water 1:1 | .05 ml | 20%/2 hrs. | 70%/7 hrs. |
| 8 | n-hexane | 100 ml | 0 | 0 | 30%/1 hr. | 100%/5 hrs. |
| 9 | n-hexane | 100 ml | Light Water[3] | .05 ml | 17%/1 hr. | 60%/5 hrs. |
| 10 | n-hexane | 100 ml | Light Water[3]/ Triethylene Glycol, 1:1 | .05 ml | 8%/1 hr. | 46%/5 hrs. |
| 11 | Benzene | 100 ml | 0 | 0 | 90%/24 hrs. | |
| 12 | Benzene | 100 ml | Aer-O-Water/ Triethylene Glycol 1:1 | 0 | 20%/24 hrs. | |
| 13 | Kuwait Crude Oil | 100 g | 0 | 0 | 6.8%/24 hrs. | |
| 14 | Kuwait Crude Oil | 100 g | Aer-O-Water[2]/ Triethylene Glycol, 1:1 | .05 | 0.6%/24 hrs. | |
| 15 | So. La. Crude | 100 g | 0 | 0 | 2.8%/7 hrs. | |
| 16 | So. La. Crude | 100 g | Aer-O-Water[2]/ Triethylene Glycol, 1:1 | .05 | 0.1%/7 hrs. | |

[1]Varsol is the trademark for a series of aliphatic solvents sold by Exxon Chemical Company, U.S.A., N.Y., N.Y.
[2]Aer-O-Water is the trademark for a foaming agent sold by National Foam Systems Inc., West Chester, Pa.
[3]Light Water is the trademark for a foaming agent sold by Minnesota Mining & Manufacturing Company, St. Paul, Minnesota.

EXAMPLE 2

This test illustrates the unique effectiveness of the evaporation retardant mixture of the present invention. In this test, a number of samples of crude oil were placed in an open 120 ml beaker and allowed to stand for 24 hours at ambient conditions. In each of these tests, 0.05 ml of various surface active agents were applied to the surface of the crude oil. For comparative purposes, several samples were maintained untreated. For 24 hours, the loss of crude oil was measured. The results of these tests are given in Table II below. As can be seen from the data, commercially available foaming agents which also are strong detergent surfactants are not totally effective alone in suppressing vapor loss.

| 5 | Kuwait | 0 | 10.1 |
| 6 | Kuwait | Aer-O-Water[1] | .5 |
| 7 | Kuwait | Light Water[2] | 6.1 |
| 8 | Kuwait | Aer-O-Water[1]/Light Water[2]/Polyethylene Glycol[3], 1:1:1 | .4 |

(Water[2]/Polyethylene Glycol[3], 1:1:1)

[1]Aer-O-Water is the trademark for a foaming agent sold by National Foam Systems, Inc. West Chester, Pa.
[2]Light Water is the trademark for a foaming agent sold by Minnesota Mining & Manufacturing Company, St. Paul, Minn.
[3]The molecular weight of the polyethylene glycol used was 200.

EXAMPLE 3

This example demonstrates the effective barrier film thickness on evaporation rate. In this particular test a 190 mm diameter evaporation dish was charged with 800 ml of commercially available unleaded gasoline. Varying thicknesses of the evaporation retardant mixture was applied to the surface of the gasoline and the amount of gasoline lost over a period of time was determined. For the purpose of this test, the evaporation retardant mixture consisted of Aer-O-Water, Light Water plus polyethylene glycol in a weight ratio of 1:1:0.2. Further details of the test and the results given in Table III below. As can be seen from Table III, a film thickness of greater than 70 monolayers reduces evaporation loss; however, a film thickness of 210 monolayers and greater is most effective. Indeed, it is particularly preferred that the film thickness be at least 350 monolayers.

TABLE III

EFFECT OF BARRIER FILM THICKNESS ON EVAPORATION RATE 190 mm diameter evaporation dish
Exxon Unleaded Gasoline

| Elapsed Time, Hrs. | | 0 | 0.5 | 1 | 2 | 3 | 6 | 7 |
|---|---|---|---|---|---|---|---|---|
| Monolayer Applied, Microliters | Film Thickness In Monolayers | | | Evaporation Loss, Percent | | | | |
| 0 | 0 | 0 | 10 | 16 | 25 | 31 | 42 | 46 |
| 5 | 35 | 0 | 7 | 12 | 22 | 35 | 40 | 41 |
| 10 | 70 | 0 | 6 | 10 | 20 | 27 | 40 | 42 |
| 30 | 210 | 0 | 0 | 1 | 4 | 8 | 18 | 21 |
| 50 | 350 | 0 | 0 | 0 | 0 | 0 | 0 | 0 |

EXAMPLE 4

Figure 2:
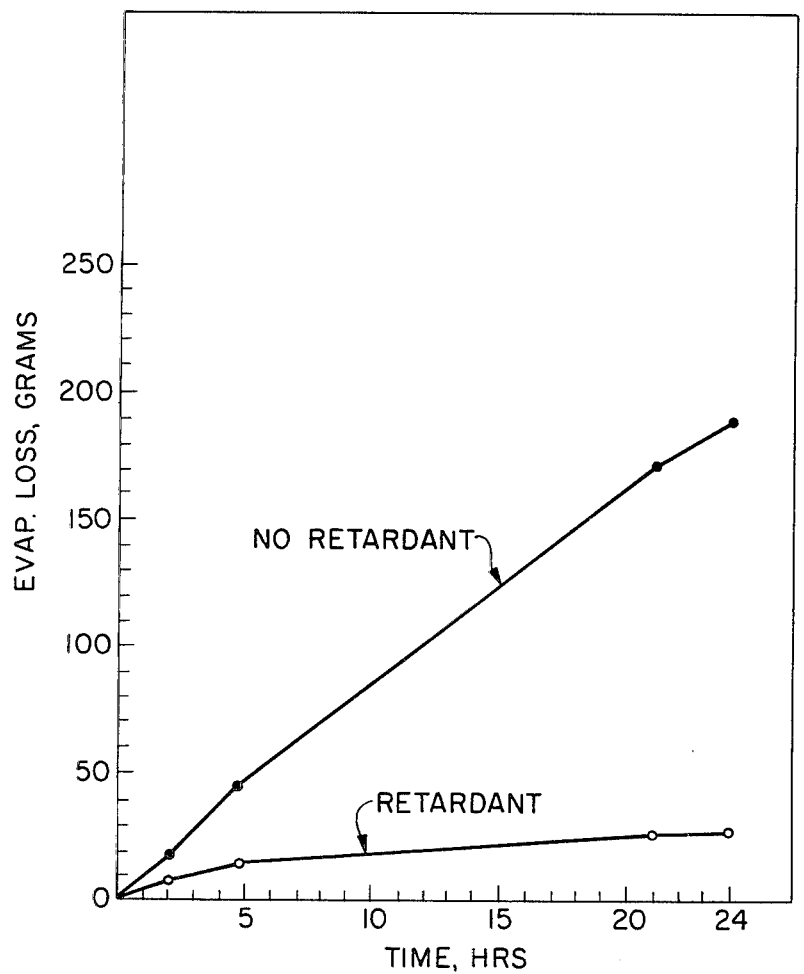
FIG. 2 is a graphic representation comparing the evaporation loss of a sample of an untreated Southern Louisiana Crude oil with a sample of the same crude treated in accordance with the present invention.
Figure 3:
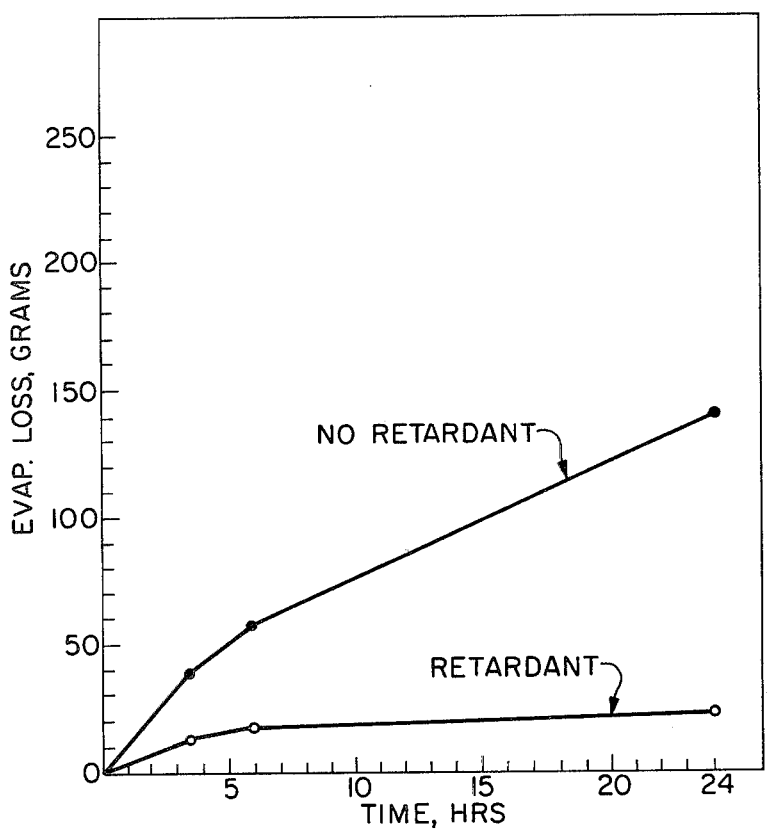
FIG. 3 is a graphic representation comparing the evaporation loss of a sample of an untreated Arabian light crude oil with a sample of the same crude treated in accordance with the present invention.
Figure 4:
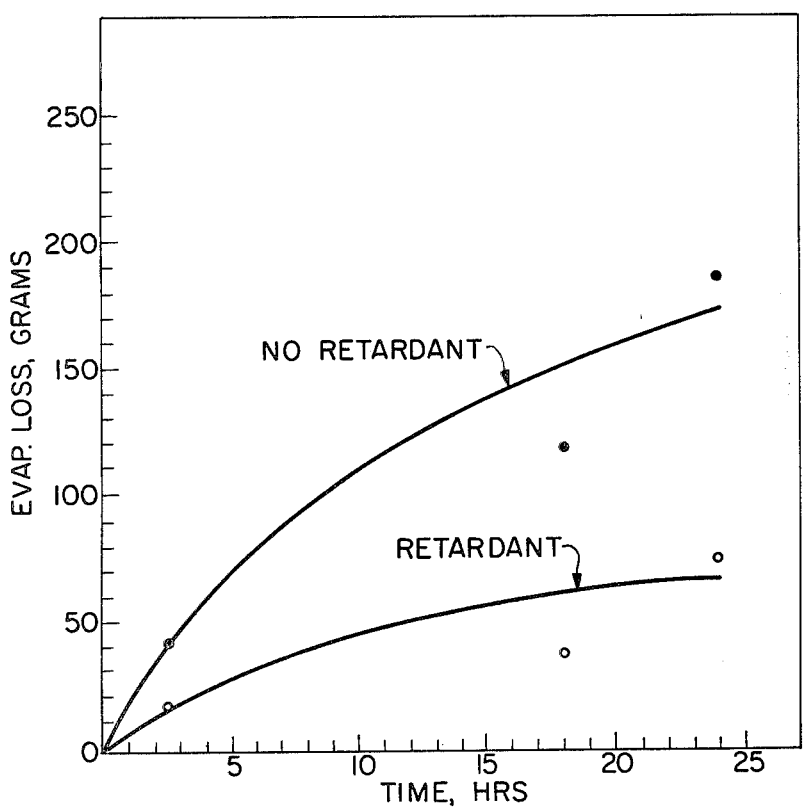
FIG. 4 is a graphic representation comparing the evaporation loss of a sample of an untreated Nigerian Light Crude oil with a sample of the crude treated in accordance with the present invention.

In order to simulate field conditions to some degree, steel containers of approximately 5 gallon capacity were constructed as shown diagrammatically in FIG. 1. These steel containers had baffles extending downwardly from the top of the steel container to approximately mid point. A vent, approximately ½ inch in diameter, was provided at one end of the upper surface of the steel tank. Each tank was charged with equal amounts (approximately 4 gallons) of a crude oil and rocked repetitively through an angle of ±10° over the period of the test. As can be seen in FIG. 1, the internal baffles extended sufficiently downwardly into the test liquid so that as the containers were slowly rolled, the baffles would penetrate the surface of the test liquid and promote a pumping of the vapors through the vent as the vapor space was compressed during the rolling action. The test tank was rocked 180 times per hour. In this series of these tests, the oil was sprayed with 0.8 ml amount of an evaporative retardant mixture consisting of Aer-O-Water, Light Water and polyethylene glycol in the weight ratio of 1:1:0.2 in an amount sufficient to provide the oil with a film thickness of from about 500 to 1000 monolayers on the surface of the oil. The results of these tests are set forth graphically in FIGS. 2 through 4.

What is claimed is:

1. An evaporation retarding mixture capable of forming a continuous stable film over the surface of a liquid hydrocarbon body consisting essentially of: a surfactant or mixture of surfactants and a polyglycol, said surfactant or mixture of surfactants being selected from materials that are insoluble in the liquid hydrocarbon body, which have hydrophobic moieties at the end of hydrophilic hydrocarbon groups having greater than 8 carbon atoms and which materials are capable of forming stable foams with air and water and said polyglycol being selected from dihydroxy derivatives of linear aliphatic hydrocarbons having a molecular weight of from about 100 to about 1200, the amount of polyglycol in said composition ranging from about 5 wt. % to about 50 wt. % based on the total weight of the evaporation retarding mixture.

2. The composition of claim 1 wherein 50 wt. % of polyglycol is present in said mixture.

3. The mixture of claim 1 wherein the polyglycol is selected from triethylene glycol, polyethylene glycol and polypropylene glycol.

4. The mixture of claim 2 wherein the polyglycol is triethylene glycol.

5. The mixture of claim 1 wherein the polyglycol is polyethylene glycol having a molecular weight of about 400.

6. The mixture of claim 1 wherein the surfactant has 16 carbon atoms with hydrophilic portion of the molecule.

7. The composition of claim 1 wherein the surfactant is a sulfosuccinate.

8. A composition for use in forming a continuous film on the surface of crude oil to suppress evaporation thereof consisting essentially of: surfactant or mixture of surfactants in combination with a polyglycol, said surfactant or mixture of surfactants being selected from materials that are insoluble in the crude oil, which have hydrophobic moieties at the end of hydrophilic portions of the molecules, which hydrophilic portion has between 8 and 16 carbon atoms, and which surfactant or mixture of surfactants is capable of forming stable foams with air and water, said polyglycol being selected from dihydroxy derivatives of linear aliphatic alkanes having molecular weights of from about 100 to about 1200, the amount of polyglycol being in the range of from 5 wt. % to about 50 wt. % based on the total weight of the mixture.

9. The composition of claim 8 wherein the polyglycol is a polyethylene glycol having a molecular weight of about 400.

10. The composition of claim 1 wherein the amount of polyglycol ranges from about 9 wt. % to about 11 wt. % based on the total weight of the mixture.

11. A composition for use in forming a continuous film on the surface of a liquid hydrocarbon body to suppress evaporation thereof consisting essentially of: a mixture of surfactants in combination with a polyglycol, said mixture of surfactants being selected from materials that are insoluble in the liquid hydrocarbon body, which have hydrophobic moieties at the end of hydrophilic hydrocarbon groups and in which the number of carbon atoms in the hydrophilic portion of the molecule is between 8 and 16, and wherein the mixture of surfactants is capable of forming stable foams with air and water, said polyglycol being selected from a hydroxy derivative of linear aliphatic alkanes having molecular weights of from about 100 to about 1200, the amount of polyglycol being in the range of from about 9 wt. % to about 11 wt. % based on the total weight of the mixture.

* * * * *